Nov. 21, 1950 — W. G. ROMAN — 2,530,994
ELECTRONIC CONTROL SYSTEM FOR DYNAMOELECTRIC MACHINERY
Filed April 19, 1949 — 4 Sheets-Sheet 1

WITNESSES:
Robert A. Baird
New C. Groove

INVENTOR
Walter G. Roman.
BY C. M. Avery
ATTORNEY

Patented Nov. 21, 1950

2,530,994

UNITED STATES PATENT OFFICE 2,530,994

ELECTRONIC CONTROL SYSTEM FOR DYNAMOELECTRIC MACHINERY

Walter G. Roman, Buffalo, N. Y., assignor to Westinghouse Electric Corporation, East Pittsburgh, Pa., a corporation of Pennsylvania Application April 19, 1949, Serial No. 88,266

13 Claims. (Cl. 318—345)

My invention relates to electronic systems for controlling or regulating the operation of dynamoelectric machinery by direct current supplied from an alternating current source under control by an output magnitude of that machinery. In a more particular aspect, the invention concerns direct-current drives electronically controlled from an alternating power line, and especially sectional drives of this kind for paper mills or the like fabricating equipment.

Known electronic systems for controlling the speed of a D. C. motor or the output voltage of a generator are equipped with gaseous discharge rectifiers, such as ignitrons or thyratrons, which are connected to an alternating-current line and are controlled through a voltage amplifier responsive to the difference between an adjusted constant reference or pattern voltage indicative of the desired machinery output and a condition-responsive cue or pilot voltage which varies in dependence upon the actual output of the machinery. In accordance with the fact that the output current applied to the dynamoelectric machinery is a direct current and the cue voltage usually is a direct voltage, the electronic tube circuits of the conventional systems are also energized by direct current.

In many instances the requirements imposed on these tube circuits are manifold and exacting. For instance, if an electronic speed control system is expected to automatically limit the motor current during accelerating or overload periods, or if the system is to be stabilized against hunting, the tube circuits must also respond to regulatory or corrective control voltages. On the other hand, the tube circuit must discriminate against disturbance voltages as may be due to insulation currents or cross connections, so that the latter voltages have no effect on the control and regulating performance. Such requirements resulted in intricate circuit designs which, however, leave much to be desired as regards accuracy and reliability of control performance.

It is an object of my invention to provide electronic systems for the direct-current control of a dynamo-electric machine which satisfy requirements of the above-mentioned kind with an accuracy and reliability of control and regulating performance far superior to that of the known systems.

Another object of the invention is to afford in industrial electronic control systems, such as for dynamoelectric machinery, a complete separation of the direct-current voltages applied to the input end from the direct-current output applied to the circuit or machine to be controlled, thus reducing or obviating the detrimental effects of insulation or other fault voltages.

Still another object of the invention is to improve and simplify the phase shift circuit for providing an alternating component of grid voltage for the gaseous power rectifier of such systems.

Another object of the invention is to make such systems less sensitive to changes in the amplifier tube characteristics as are due, for instance, to aging and to permit the temporary removal of a tube, for instance for checking or replacement, without appreciably reducing the gain of the amplifier.

According to the invention, although the control system not only receives a direct-current input under control by the dynamoelectric machine but also applies a direct-current output to that machine, I interpose between the D.-C. input end and the D.-C. output end a network of tube circuits which are energized by alternating current and are equipped with an inductive coupling that mutually isolates the input and output ends.

According to another feature of the invention, I provide alternating current means to serve as sources for the cue voltage and reference voltage, respectively, and I apply these alternating voltages to the input end of the electronic control system through a coupling transformer thus obtaining a complete isolation of the cue and reference voltage sources from the rest of the electronic control devices.

According to another feature of the invention, referring to a system with an automatic limitation of the rectified output current, I energize the tubes of the current-limit control device by alternating current and provide another coupling transformer between the current limit device and the main portion of the electronic control system.

According to another feature of the invention, I supply the thyratrons or other gaseous power tubes of the power rectifier in the system with an alternating component of grid or control voltage by connecting a resistance-capacitance circuit with the anode power transformer of each tube so that this anode transformer is also the immediate source of the alternating component grid voltage, the phase characteristics of the resistance-capacitance circuit being such as to secure the phase lag necessary for the control of the tube. In this manner the grid phase-shift device for each individual power tube is not only simplified but is also independent of the phase rotation of the power supply line.

The foregoing and other objects, features and advantages of the invention will be apparent from the following description in conjunction with the embodiment of a sectional drive for a paper mill shown on the drawing:

Figure 1:
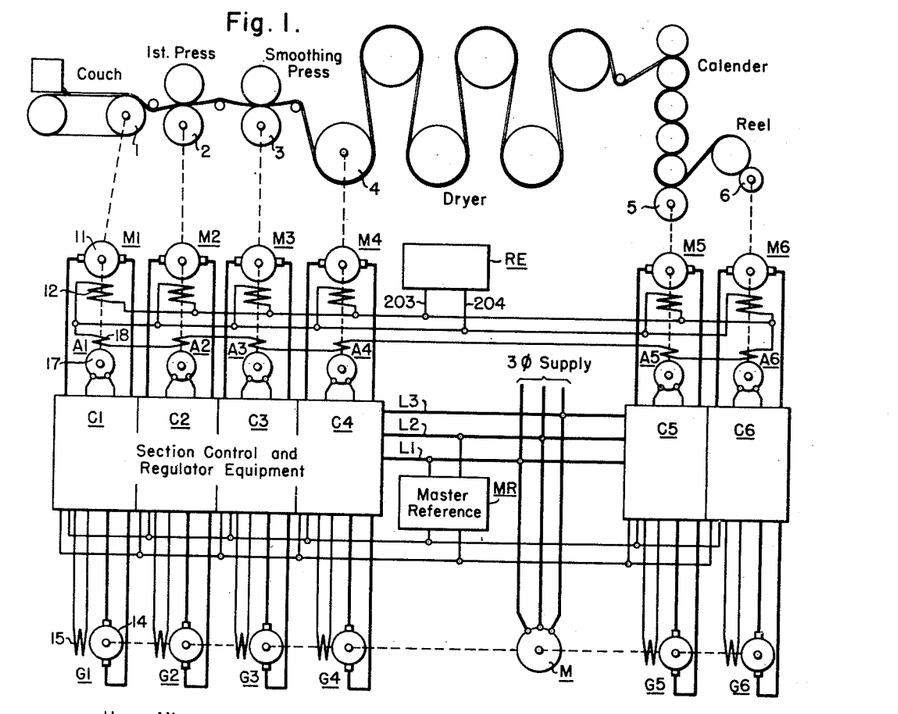
Figure 1 is a schematic illustration of the paper mill and the appertaining sectional drive according to the invention.

The paper machine drive represented in Fig. 1 has a couch section with a couch roll 1 driven by a section motor M1. From the couch section the solidifying paper passes through a first roll press 2 with a press roll driven by a section motor M2. From the first press the paper passes through a smoothing press whose driving roll 3 is connected to a motor M3. Thence, the paper passes through a dryer section with a roll 4 driven by a motor M4. After leaving the dryer section, the paper passes through a calender with a drive roll 5 connected to a motor M5. The finished paper is wound up on a reel whose drive roll or gear 6 is driven from a motor M6. More individually driven presses, calenders or other devices than shown may be present, but the illustrated example of six driven sections suffices for the purpose of explaining the invention. The section motors are controlled to operate at accurately correlated speeds and these speeds are regulated to remain at the desired values. The means for securing this control and regulation are designed as follows.

The section motors M1 through M6 are individually energized by controlled voltage from respective generators G1 through G6 which may be driven by a common motor M, preferably an alternating current motor, energized from the leads L1, L2, L3 of a three-phase alternating-current supply line.

Each drive section is equipped with controlling and regulating equipment schematically represented in Fig. 1 by block diagrams at C1 through C6, respectively. Each control section is supplied with an adjustable constant reference voltage from a master reference unit schematically represented at MR. Each individual control and regulating equipment is further supplied with variable signal voltage whose magnitude is a measure of the motor speed of the particular drive section. The signal voltage is supplied from alternating-current tachometer generators A1 through A6 which are driven by the respective section motors M1 through M6, so that frequency and magnitude of the tachometer output voltage vary with the motor speed (for instance, 110 volts and 1800 C. P. S. at 1800 R. P. M. with a tachometer field excitation of 25 volts and 0.5 ampere).

Figure 2:
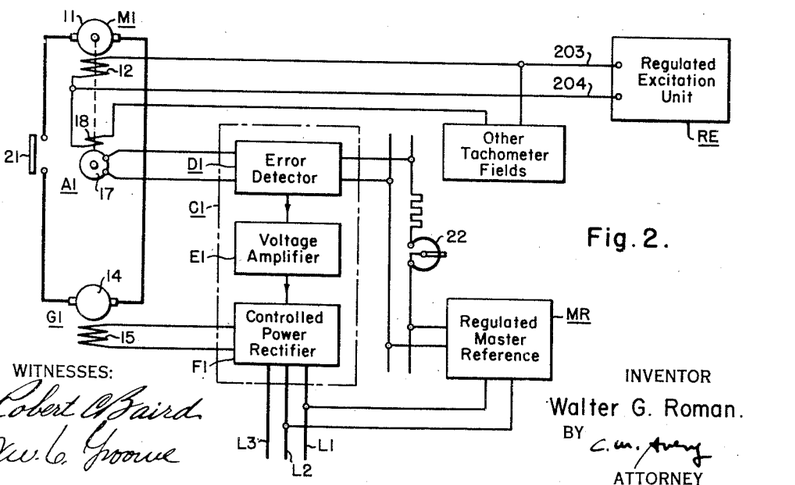
Fig. 2 is a more detailed schematic diagram of one of the drive sections.

The design and operation of each individual drive section will be further understood from the schematic diagram of Fig. 2. In Fig. 2 the armature and the separately excited field winding of the section motor M1 are denoted by 11 and 12 respectively, the armature and main field winding of the generator G1 by 14, 15 respectively, and the armature and field winding of the tachometer alternator A1 by 17 and 18 respectively. The armature 11 of motor M1, and the armature 14 of generator G1 are loop-connected through the contact 21 of a main contactor switch. The motor field winding 12 and the field winding 18 of the alternator receive constant excitation from an accurately regulated source of direct excitation voltage schematically represented in Figs. 1 and 2 at RE. Source RE is common to all motor and tachometer field windings.

The alternating signal voltage from alternator A1 is proportional to the speed of motor M1. The speed signal and the reference signal are matched in an error detector D1, and the difference between them is amplified in an alternating-current amplifier E1 and then applied to an electronic rectifier F1, which supplies the field current for the section generator G1, thus controlling the generator voltage impressed on the armature 11 of motor M1 and hence the operating speed of the motor. A draw adjusting rheostat 22 is inserted between the master reference MR and the error detector D1. Changing the reference signal either by means of the draw adjusting rheostat 22, or by means of a rheostat in the master reference unit MR, will change the speed of the section motor M1 because the control equipment C1, comprising the error detector D1, amplifier E1 and rectifier F1, tries to make the difference between the speed signal and the reference signal zero.

Figure 3:
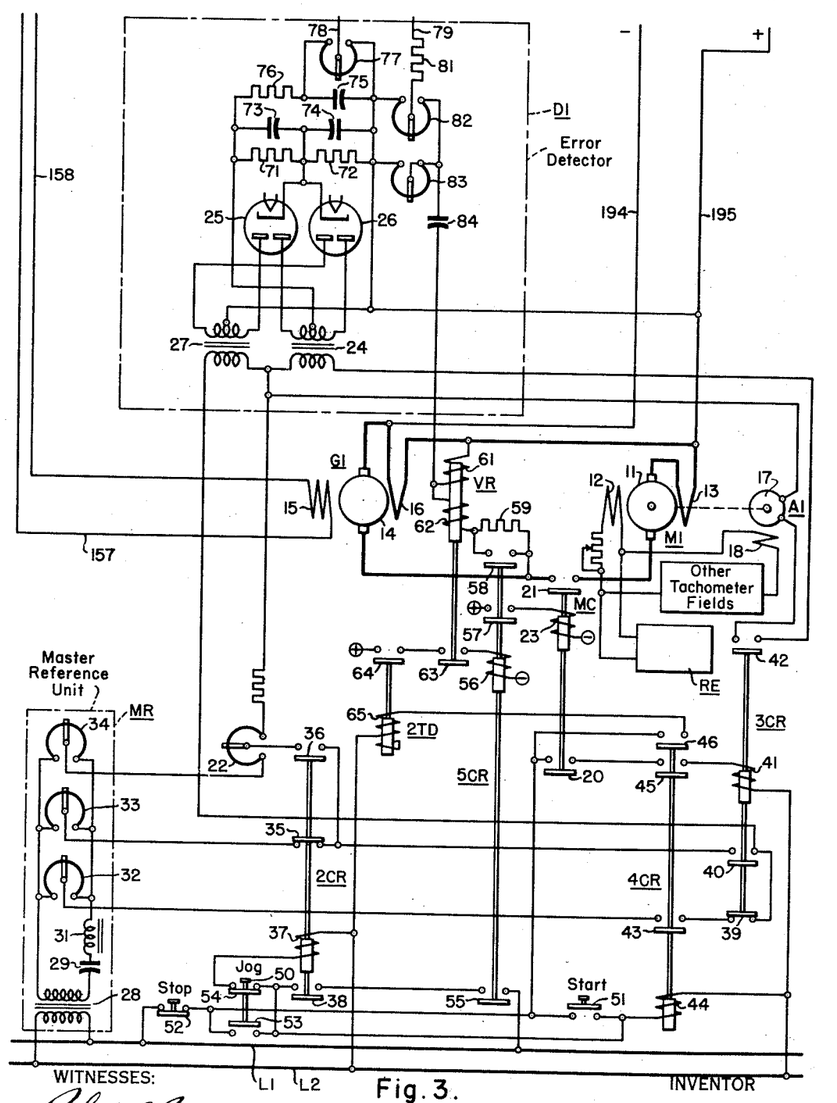
Figs. 3 and 4 together illustrate the electric circuits of the same drive section more in detail, the portion shown in Fig. 4 is to be attached above that shown in Fig. 3.
Figure 4:
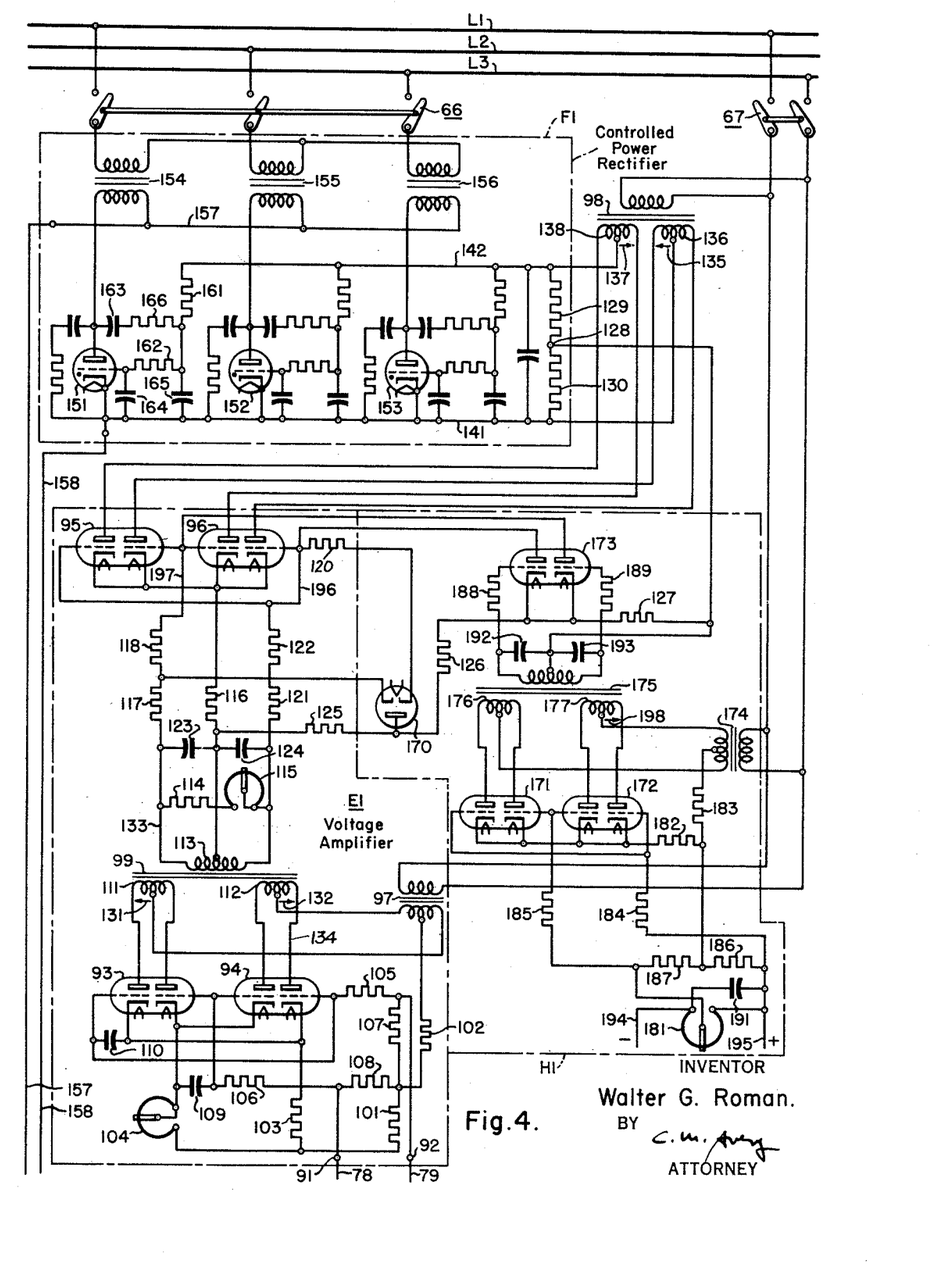

Referring now to the detailed illustration of the system according to Figs. 3 and 4, it will be recognized from Fig. 3 that the motor generator loop circuit may also include a series field winding 13 on the motor M1, and a series (commutation) field winding 16 on the generator G1. The above-mentioned main contact 21 for opening and closing the loop circuit is preferably the contact of an electromagnetic main contactor MC with a control coil 23 and an interlock contact 20.

The signal voltage from the armature 17 of the tachometer alternator A1 is applied through a transformer 24 to a rectifier which comprises two twin tubes 25 and 26. The constant reference voltage from the master reference MR is applied to the same rectifier tubes through a transformer 27.

In the illustrated embodiment, the master reference unit MR which supplies the constant voltage not only to the input transformer 27 of the rectifier shown in Fig. 3 but also to the corresponding transformer of each of the other sections, is shown to be of the static type. The master reference unit is energized through a transformer 28 from the buses L1 and L2 of the above-mentioned three-phase alternating-current supply line. The secondary voltage (for instance, 110 volts, 60 C. P. S. from transformer 28 is regulated and filtered by a capacitor 29 and a saturated choke coil 31 and is impressed across potentiometer rheostats 32, 33 and 34. The adjusted constant voltage to be impressed on the transformer 27 appears across the adjustable sliders of these rheostats and is applied to the control equipment of all drive sections. The master reference unit provides adjusted alternating voltages whose value remains constant although the line voltage may vary (for instance, as much as ± 5%) or the line frequency may vary (for instance between 55 and 65 C. P. S.).

The circuits connecting the sliders of rheostats 32, 33, 34 of the master reference unit MR with the transformer 27 of the voltage amplifier E1 are under control by contacts 35, 36 of a relay 2CR, whose control coil 37 also actuates an interlock contact 38. These circuits are also controlled by contacts 39, 40 of a relay 3CR, whose coil 41 also actuates a contact 42 series connected in the output circuit of the alternator A1. The contact 43 of another relay 4CR is also effective to control the connection between master reference unit MR and transformer 27, and is operated by a coil 44 which also actuates contacts 45 and 46; contact 45 and interlock contact 20 of contactor MC control the coil circuit for relay 3CR, while contact 46 controls the coil circuit for relay 2CR. The coil circuit of relay 4CR is under control by a normally open start contact 51, a normally closed stop contact 52 and the make contact 53 of a jog switch 50 which has a break contact 54 in the coil circuit of contactor 2CR. Contacts 51, 52 and switch 53 are of the pushbutton type. The master reference circuits further include an interlock contact 55 of a relay 5CR. Coil 56 of relay 5CR actuates also a contact 57 for controlling the coil circuit of contactor MC and a contact 58 connected across a resistor 59. A voltage relay VR has its coils 61, 62 series connected with resistor 59 across the terminals of motor M1. The contact 63 of voltage relay VR controls the coil circuit of relay 5CR in series connection with the contact 64 of a time delay relay 2TD whose main coil 65 has a circuit controlled by contact 46 of relay 4CR.

After the power supply line L1, L2, L3 is energized, and assuming that the tube circuits still to be described are placed in operative condition by the closing of switches 66 and 67 (Fig. 4), the contactors and relays (Fig. 3) are in condition to operate in the following manner.

When the start button 51 is depressed, relays 2CR and 4CR pick up. Contact 46 of relay 4CR energizes the timing relay 2TD which picks up immediately. Contact 43 of 4CR closes the input circuit of transformer 27 through the slider of rheostat 32, thus energizing the transformer 27 for breakaway operation of the system. As will be explained, this causes the field winding 15 of generator G1 to be energized to build up generator voltage. As soon as this voltage reaches a given value, say 30 volts, the voltage relay VR picks up. Coil 56 is now energized through contacts 63 and 64 so that relay 5CR picks up, shorts resistor 59, and energizes the main contactor MC which closes the motor-generator circuit so that motor M1 becomes energized. Contact 55 of 5CR, in series with contact 38 of 2CR, now shorts the start contact 51 so that relays 4CR and 2CR remain sealed in when thereafter the start button is released. Contact 20 of contactor MC now completes the circuit of coil 41. Relay 3CR picks up and closes at contact 42 the tachometer circuit thus energizing the input transformer 24 in dependence upon the motor speed. The speed regulation and control then effective will be described in a later place.

When the stop button 52 is depressed, relays 2CR, 3CR, 4CR and timing relay 2DT are deenergized immediately. Contact 64 of the timing relay, however, remains closed an additional interval of time. The main contactor MC is held in until the generator voltage lowers sufficiently to drop out the voltage relay VR. If for some reason relay VR does not become de-energized then, after a 5 to 10 second period relay 2TD will open the 5CR relay circuit and drop out the MC contactor thus stopping the motor.

Depressing the jog button 50 will energize relay 4CR. Relay 4CR closes contact 46 and energizes the timing relay 2TD. As soon as the generator builds up sufficient voltage, relay VR picks up. Then, relay 5CR also closes and energizes the contactor MC so that the motor is energized. Relay 3CR has its coil 41 energized through contacts 45 and 20 and closes contact 42 in the tachometer circuit. Relay 2CR remains dropped out and its closed contact 35, in series with contact 40 of relay 3CR, now applies to transformer 27 a reference voltage taken from the slider of rheostat 33 and adjusted for the desired jogging (wash-up) speed. Since contact 38 of relay 2CR remains open, the relay 4CR is not sealed in and hence drops out for resetting the relays to the stop condition when the jog button 50 is released by the operator.

Reverting now to the above-mentioned rectifier of the error detector D1, it will be recognized from Fig. 3 that the two input transformers 24 and 27 are so connected with the respective sections of the twin rectifier tubes 25 and 26 that the stepped-up and rectified voltage from transformer 24 is impressed across a resistor 71, while the stepped-up and rectified voltage from transformer 27 appears across another resistor 72. Resistors 71 and 72 are connected in series-opposed relation to each other so that the difference of the rectified voltage appears across the series arrangement. This difference voltage is filtered by a filtering circuit composed of capacitors 73, 74, 75 and a resistor 76, and is applied across a sensitivity-adjusting potentiometer rheostat 77. The output voltage of the error detector D1 appears across leads 78, 79. Lead 78 is connected to the slider of rheostat 77. Lead 79 is connected with rheostat 77 through a resistor 81 and through an anti-hunt rheostat 82 and a time-constant rheostat 83.

The potentiometer rheostats 82 and 83 form part of an anti-hunt circuit for stabilizing the regulating performance. This circuit is connected through a capacitor 84 to a point between coils 61 and 62 of the voltage relay VR. The anti-hunt circuit tends to oppose any sudden change in regulated voltage. For example, if the operator momentarily increases the reference voltage, the voltage applied to the field winding of the section generator is increased so that the speed of the section motor also increases. The increased voltage across the coils of the VR relay causes a small charging current to flow through capacitor 84 and thus produces across potentiometer rheostat 82 an anti-hunt voltage of such a polarity as to cause the amplifier output to the section generator field to decrease, thus stabilizing the system. The rheostat potentiometer 83 permits changing the charging and discharging time of capacitor 84.

The above-mentioned output leads 78, 79 of the error detector D1 are connected to the input terminals 91, 92 (Fig. 4, bottom) of the voltage amplifier E1. This amplifier has two stages comprising a first pair of twin tubes 93, 94, a second pair of twin tubes 95, 96, two appertaining power transformers 97, 98 and a coupling transformer 99. Transformer 97 supplies alternating voltage from the power line to the plate circuit of tubes 93, 94. Transformer 98 supplies alternating voltage from the power line to the plate circuit of tubes 95, 96.

The tubes 93 and 94 have a common cathode resistor 101, one end of which is connected through a series resistor 102 with the midpoint of the secondary of transformer 97. One cathode of each twin tube 93, 94 is connected to the other end of the cathode resistor 101 through a fixed balancing resistor 103, while the other cathodes are connected to the just-mentioned other end of resistor 101 through a rheostat 104 which permits balancing the outputs of the two twin tubes. A grid resistor 105 has one end attached to the two grids in the correlated respective sections of the twin tubes, while one end of a similar grid resistor 106 is attached to the other two grids. The other ends of the respective grid resistors 105, 106 are interconnected by two series-connected resistors 107, 108 whose common intermediate point is connected between resistors 101 and 102. The voltage from the error detector D1 is impressed from terminal points 91, 92 across the series-connection of resistors 107, 108. By-pass capacitors of small capacitance (e. g. 0.001 mfd.) are provided at 109 and 110.

The anodes of twin tube 93 are interconnected across the primary 111 of coupling transformer 99, and the anodes of twin tube 94 are interconnected across the primary 112. Connected across the secondary 113 of coupling transformer 99 is a resistor 114 in series with a gain-adjusting rheostat 115. Secondary 113 has a midtap connected through a resistor 116 to all cathodes of twin tubes 95, 96. One end of secondary 113 is connected through series resistors 117, 118 with one grid of each twin tube 95, 96. Resistor 120 is a coupling resistor of a magnitude similar to that of resistor 118. The other end of secondary 113 is connected through series resistors 121, 122 with the other grids of these tubes. Bypass capacitors are provided at 123 and 124. The midpoint of secondary 113 is connected through a series arrangement of resistors 125, 126, 127 with a common terminal point 128 of two series-connected load resistors 129, 130 whose other terminals are connected with the respective midpoints of the two secondaries 136 and 138 in power transformer 98.

Disregarding for the present, the functioning of a current-limiting control device still to be described, the voltage amplifier E1 operates as follows.

When a positive signal is applied to terminal point 91, tube 94 passes current in the direction of arrow 132 through the right section of primary 112 during the positive half-cycle period of the alternating current supplied from transformer 97, and tube 93 passes current in the direction of arrow 131 through the left section of primary 111 during the negative half-cycle period. This produces an alternating voltage in the second winding 113 of transformer 99, which makes secondary lead 133 positive when primary lead 134 is positive. As a result, the right section of tube 95 passes current in the direction of arrow 135 through one section of the secondary 136 of transformer 98 during positive half-cycles, and the left section of tube 96 passes current in the direction of arrow 137 through one section of the secondary 138 during negative half cycles. These currents flow from the cathode-connected point 128 through respective resistors 130 and 129 in mutually opposed directions. This produces across load resistor 129 a larger voltage than across load resistor 130. Hence, lead 141 will be positive, and lead 142 negative. Tube 93 and the other sections of tubes 95 and 96 operate similarly to apply the same polarities to leads 141 and 142. The amplifier output voltage between leads 141 and 142, of course, varies (for instance, between 49 and 275 volts) in accordance with the difference between the master reference voltage and the speed signal voltage applied to transformers 27 and 24 (Fig. 3). When the signal voltage across terminal points 91, 92 of the voltage amplifier is reversed, i. e., when point 91 is negative, the amplified voltage across load resistor 130 is larger than that across load resistor 129. Hence, then the resultant output voltage between leads 141, 142 is positive at lead 141 and negative at lead 142.

It should be noted that the above-described design offers the advantage that, due to the described arrangement of the plate connections to the dual tubes of the error detector and amplifier circuits, the amplifier will operate with only a slight reduction in gain when one of the dual tubes in the various positions is removed. This makes the system much less sensitive to aging of tubes or any other change which decreases the sensitivity of the tubes. It also permits the temporary removal of a dual tube for checking or replacement without unduly interfering with the operation of the system.

The controlled rectifier unit F1 is essentially a power amplifier energized by alternating current and controlled by variable direct-current voltage from amplifier E1 to supply rectified field current to the section generator. According to Fig. 4, the unit F1 comprises three gaseous discharge tubes 151, 152, 153, for instance thyratrons, which are energized from anode transformers 154, 155, 156, respectively. While three individual anode transformers are shown, a single three phase transformer may be used instead. The transformer secondaries are Y-connected and have a common lead 157 attached to one terminal of the generator field winding 15 (Fig. 3). The above-mentioned output lead 141 of voltage amplifier E1 is connected to the cathodes of tubes 151, 152, 153 and also in connection through a lead 158 with the other terminal of the generator field winding 15. The other output lead 142 of the voltage amplifier E1 is connected through resistors 161, 162 with the control grid of gas tube 151 and through similar resistors with the grids of tubes 152 and 153. Consequently, the voltage amplifier E1 impresses on the grid circuits of the gas tubes a controlled and reversible direct-current component of grid voltage.

Another component grid voltage, but of alternating character, is impressed on each of these grid circuits by a phase shift network. This network, for tube 151, is composed of capacitors 163, 164, 165 and resistors 166, 161, 162 of which the resistors 161 and 162 have already been mentioned. The alternating component of grid voltage appears across capacitor 164 (for instance, about 26 volts) and lags the anode voltage (for instance about 95°). The phase shift of networks for tubes 152 and 153 are similar. The two component grid voltages for each tube are superimposed on each other for controlling the length of the interval during which each tube conducts current within its positive half cycle period. Since the alternating component has a fixed characteristic, the conductance control depends only upon the variations of the grid voltage component supplied from the voltage amplifier E1.

It should be recognized that the phase shift network for each power tube not only derives its voltage from the anode transformer and thus obviates the conventional provision of separate phase-shift transformers, but also is not tied into the other phases of the three-phase anode supply so that the phase rotation of the power supply has no effect on the phase-shift network and can be ignored.

When the system is in operation and the speed signal voltage impressed by the tachometer alternator A1 on the transformer 24 is in accordance with the reference voltage impressed by the master reference unit MR on the transformer 27, the direct component of grid voltage which the voltage amplifier E1 supplies to the tubes of the controlled power rectifier F1 is such as to make the tubes 151, 152, 153 apply to the generator field winding 15 the excitation voltage just needed to maintain the section motor M1 at the desired speed. If the speed, for any reason, increases above the desired value, the tachometer voltage on transformer 24 also increases and causes the voltage amplifier to decrease the direct component of grid voltage for tubes 151, 152, 153. This retards the firing point of these tubes, thus reducing the voltage on field winding 15 so that the motor speed is restored to the correct value. If the speed drops below the desired value, the opposite regulating action takes place also with the effect of maintaining the speed at the correct value.

As mentioned, the voltage amplifier E1 is also equipped with a current-limit control device. This device (H1 in Fig. 4) is ineffective under normal operating conditions and then does not interfere with the just-mentioned control and regulating performance. During overload periods, however, the current-limit device superimposes a control on the voltage amplifier with the effect of reducing or limiting the direct component of grid voltage for unit F1. This may take place during starting or accelerating periods or under any overload conditions in the motor armature circuit.

The current limit device H1 comprises a double diode 170, three twin tubes 171, 172, 173, a power transformer 174, a coupling transformer 175 with the split primaries 176, 177 and a split secondary, and a current-limit adjusting rheostat 181. The cathodes of tubes 171 and 172 have a common cathode resistor 182 connected through a resistor 183 to the midpoint of the secondary in the power transformer 174. One grid of twin tube 171 and one grid of tube 172 have a common grid resistor 184, and a similar resistor 185 is connected to the other grids, respectively, of the same tubes. Two resistors 186, 187 of substantially the same resistance, usually higher than the resistance of the just-mentioned grid resistors, are series-connected between these grid resistors. The midpoint of resistors 186, 187 is attached to a point between resistors 182 and 183. An adjustable portion of the current limit rheostat 181 lies across resistors 186, 187. Two grid resistors for twin tube 173 are denoted by 188, 189. Bypass capacitors are provided at 191, 192 and 193.

The armature-current indication is taken from the motor armature circuit, for instance as shown, from across the generator series field winding 16 and is applied through negative lead 194 and positive lead 195 across the rheostat 181. As long as the armature current is below a certain value depending on the setting of current-limit rheostat 181, the current limit device does not affect the regulator. However, when the armature current exceeds this set value, the following takes place. During the positive half cycles of the alternating voltage supplied by transformer 174, the upper secondary end of transformer 174 is positive relative to the secondary midpoint. Tube 172 conducts current in the direction of arrow 198 through the right-hand section of primary 177 in transformer 175. This applies a positive potential to grid resistor 188 and a negative potential to grid resistor 189 of tube 173. The left section of tube 173 now conducts and makes the grid lead 196 of tubes 95, 96 negative. This makes the output voltage of amplifier E1, appearing between leads 141 and 142, more negative at lead 142. Hence, the grids of the thyratrons 151, 152, 153 go more negative and the thyratron output to the generator field winding 15 decreases. This decreases the generator current output and slows down the section motor. The voltage across resistor 127 is a negative bias for tube 173. This bias keeps the plate current of tube 173 at zero until tube 171 or 172 provides sufficient positive voltage to overcome the negative bias voltage. The sum of the voltages across resistors 125 and 126 is the plate supply voltage for tube 173. During the negative half cycles of the supply voltage, the current limit action is the same as just described for the positive half except that other triode sections of tubes 171, 172, 173 conduct.

During stopping of the motor, the regenerative braking effect then occurring is also subject to current limit control. Then the lead 194 is positive, and the action of tubes 171, 172, 173 is such as to prevent the thyratrons 151, 152, 153 from reducing the generator field current too rapidly.

Tube 170 acts as a snubber of voltage on the grids of tubes 95, 96 as follows. The voltage across resistor 125 imposes a small negative voltage on the plates of tube 170. Whenever the voltage from the secondary 113 of transformer 99 is sufficiently positive to overcome the negative voltage across resistor 125, tube 170 conducts. As previously explained, the current-limit action of tubes 171, 172, 173 puts a negative voltage on grid lead 196 of tubes 95, 96. The speed regulator action, as also explained, will try to overcome this current-limit action by putting a greater negative voltage on grid lead 197 of tubes 95, 96. Here is where snubber action from tube 170 comes in. Just as soon as voltage from transformer secondary 113 between the secondary midpoint and lead 133, with lead 133 being negative, becomes greater than the voltage across resistor 125, tube 170 conducts and produces across resistor 117 a voltage which makes the grid side of resistor 117 positive. As a result, the speed regulator action is prevented from making the grid lead 197 of tubes 95, 96 negative more than a limited amount so that a current limit action also takes place during braking periods of the section motor.

Figure 5:
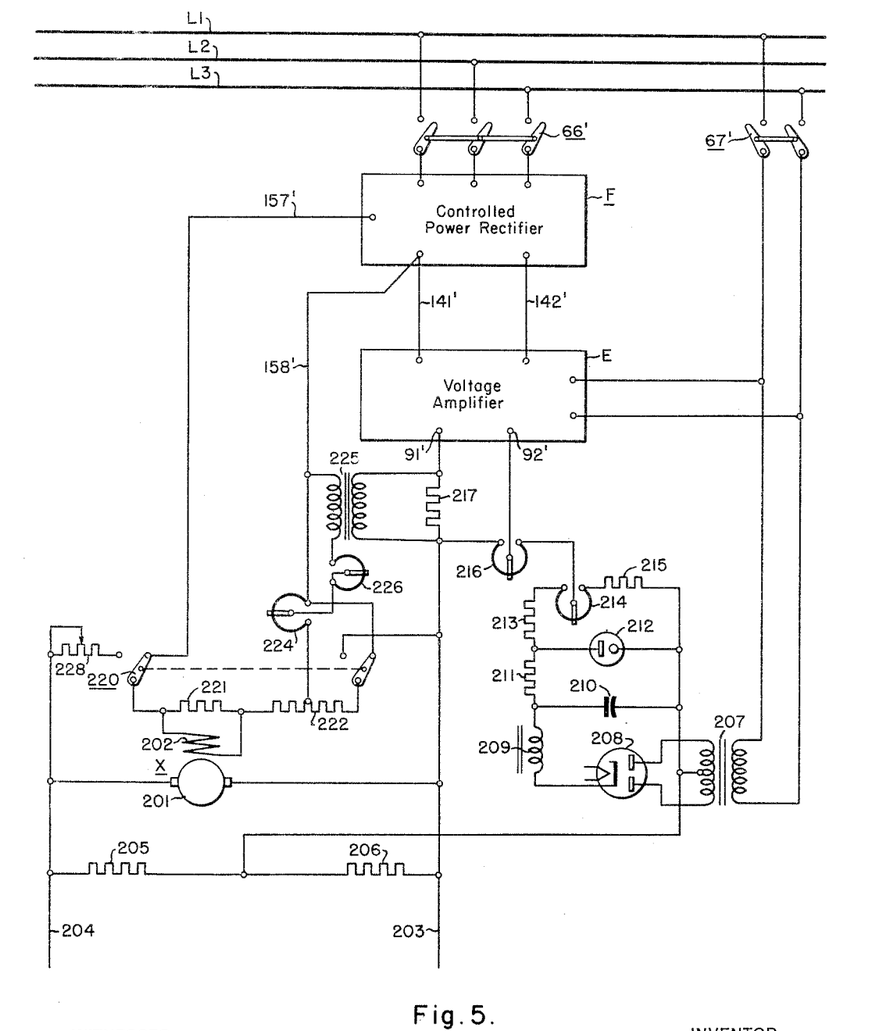
Fig. 5 represents part of a regulated voltage source which is designed according to the invention and forms part of the sectional drive represented by the preceding figures.

The above-mentioned excitation unit RE, which provides constant field voltage for all section motors and tachometer alternators, is separately illustrated in Fig. 5. The source of excitation voltage consists of a direct-current exciter X whose armature and field winding are denoted by 201 and 202 respectively. Connected to the armature terminals are the direct-current buses 204 and 203 to which the field windings of the section motors and tachometer alternators are connected (see also Figs. 1 and 2). Across the armature 201 is a voltage divider composed of series resistors 205 and 206. The voltage across resistor 206 is proportional to the bus voltage of the exciter and serves as a cue or signal voltage for the electronic control of the excitation applied to the field winding 202. This cue voltage is compared with a constant reference voltage which is supplied from a voltage regulating unit designed as follows.

A transformer 207, connected through a switch 67' to leads L1 and L3 of the three-phase supply line, energizes a twin rectifier tube 208 whose direct-current output is filtered by an inductance coil 209 and a capacitor 210 and applied through a voltage-drop resistor 211 across the electrodes of a voltage regulating tube 212, for instance, of the cold-cathode type. The direct-current voltage across tube 212 is constant (for instance, 150 volts) and is impressed across a voltage divider composed of a resistor 213, a rheostat 214 and a resistor 215. The slider of rheostat 214 is connected through a potentiometer rheostat 216 with the exciter bus 203, which in turn is connected through a resistor 217 to the input terminal 91' of a voltage amplifier E. The other input terminal 92' of amplifier E is connected to the slider of rheostat 216.

The voltage amplifier E is substantially a duplicate of the voltage amplifiers appertaining to the individual control and regulating sections C1, C2, etc., of the sectional drives, except that the voltage amplifier E for the excitation unit of Fig. 5 is not equipped with a current limit device (H1 in Fig. 4). Thus the input terminals 91' and 92' of amplifier E in Fig. 5 correspond to input terminals 91 and 92 respectively of amplifier E1 in Fig. 4. The voltage amplifier E is connected with a controlled power rectifier F which is essentially a duplicate of the power amplifiers F1, F2, etc., of the section drives. The power rectifier unit F is energized through a switch 66' from the three-phase supply line L1, L2, L3 and connected with the amplifier E by leads 141', 142' which correspond to leads 141 and 142 respectively in Fig. 4. The output leads 157' and 158' of the power rectifier F in Fig. 5, corresponding to the output leads 157, 158 in Figs. 3 and 4, supply excitation to the field winding 202 of the exciter X. The connection includes a switch 220 and two resistors 221, 222. Field winding 202 is connected across resistor 221.

Reverting to the input circuit of the voltage amplifier E, it will be noted that the resistors 217, 206, 215, part of rheostat 214, and part of rheostat 216 are series connected across the input terminals 91' and 92'. The cue voltage across resistor 206 is series-opposed to the constant reference voltage across resistor 215 and the active portions of rheostats 214, 216. Hence, the difference of the cue and reference voltages is effective across the amplifier input terminals. When this difference has a given low value at which the exciter voltage generated in armature 201 has the correct magnitude (for instance 230 volts), the excitation applied by the electronic regulating devices to the field winding 202 of the exciter has the value needed to maintain this exciter voltage constant. When the exciter voltage departs from the correct value, the difference between cue voltage and reference voltage changes accordingly and causes the electronic devices to vary the field excitation of machine X in the direction and by the amount necessary to restore the correct exciter voltage. It will be recognized that the electronic devices of the regulated excitation unit operate in much the same way as the above-described electronic control devices of the section drives.

The resistor 217 in the input circuit of the voltage amplifier E serves to superimpose on this circuit a corrective damping voltage which serves to stabilize the regulating performance. Resistor 217 is connected across the secondary of a damping transformer 225 whose primary is connected across an adjusted portion of a damping rheostat 224 in series with a time-constant adjusting rheostat 226. The damping rheostat 224 is series connected between a tap point of resistor 222 and the lead 158' and lies also across the tapped-off portion of resistor 222. Any sudden change in the exciter field current produces a momentary voltage across the damping transformer which, in the secondary of this transformer, has such a polarity as to oppose the sudden current change by its action on the input circuit of the amplifier E. In this respect the performance of the damping circuit is similar to the above-described anti-hunt circuit of the error detector D1 (Fig. 3).

Reviewing the above-described system as a whole, it will be recognized that although the input end of the electronic amplifying and power rectifying devices is supplied with a direct current signal (across terminals 91, 92 in Fig. 4; or across terminals 91', 92' in Fig. 5), and although the power output supplied to the dynamoelectric machinery that controls the input signal is also a direct current, the input and output circuits of the electronic system are coupled by tube circuits which are energized by alternating current and include a coupling transformer (99) that isolates the input end from the output end. Consequently, the passage of stray voltages or currents through the system is completely or more fully prevented than has been possible in the known systems of this type. Also the danger and possibility of undesirable cross connection is avoided.

Dealing with the electronic speed control and regulating system of the above-described section drives, it should also be noted that the reference and cue voltages are produced as alternating voltages and are applied to a coupling transformer which additionally isolates the sources of these voltages from the electronic system. In this manner the above-mentioned advantages are realized to a still further extent. Noteworthy is also the fact that the current-limit control devices are also energized by alternating current and are also coupled and isolated by a coupling transformer (175) from the rest of the electronic system.

It has been mentioned that the control and regulating units C1, C2, etc., for the section drives and for the excitation unit are substantially similar. It should be understood, of course, that some differences, not essential to the present invention proper, are usually desirable or necessary. For instance, the magnetic control relays and contactor circuits are not always identical in the various section drives because the section motors are not of the same horsepower rating and also because some of the sections, in particular the calenders, must be reversing whereas the other sections are non-reversing. For this reason a reversing contactor and a jog reverse contact may be provided, for instance, in the section drive C5 for the calender. The individual tube circuits of the electronic system may also be modified in various respects without departing from the essence and features of the invention, and it will be obvious to those skilled in the art that the invention is readily applicable for purposes other than specifically referred to in the foregoing. For instance, the disclosed speed control and regulating system may have the output leads of the power rectifier connected to the armature of a direct-current motor rather than to the field winding of a generator, in order to directly control the speed of a constant field motor by changing the voltage impressed on its armature.

I claim as my invention:

1. An electronic system for direct-current control of dynamoelectric machinery from an alternating-current source, comprising alternating-current supply means, a dynamoelectric machine circuit to be controlled, an electronic power rectifier connected between said supply means and said circuit to provide said circuit with direct-current energization, condition responsive direct-current means of variable voltage dependent upon said energization, an amplifier network connected between said power rectifier and said direct-current means and having electronic tubes for controlling said rectifier in response to said voltage, said tubes being connected to said supply means to be energized by alternating current, and coupling transformer means disposed in said network to isolate said power rectifier from said direct-current means.

2. An electronic system for direct-current control of dynamo-electric machinery from an alternating-current source, comprising alternating-current supply means, a dynamoelectric machine having a field circuit, an electronic power rectifier connected between said supply means and said circuit to provide said circuit with direct-current energization, circuit means responsive to said energization to provide variable cue voltage, reference means to provide constant reference voltage, and direct-current means connected to said circuit means and said reference means to provide direct-current control voltage in dependence upon the difference of said cue voltage and reference voltage, an amplifier network connected between said power rectifier and said direct-current means and having electronic tubes for controlling said rectifier in response to said control voltage, said tubes being connected to said supply means to be energized by alternating current, and coupling transformer means disposed in said network to isolate said power rectifier from said direct-current means.

3. An electronic system for direct-current control of dynamoelectric machinery from an alternating-current source, comprising alternating-current supply means, a dynamoelectric machine circuit to be controlled, an electronic power rectifier connected between said supply means and said circuit to provide said circuit with direct-current energization, condition responsive direct-current means of variable voltage dependent upon said energization, an amplifier network connected between said power rectifier and said direct-current means and having electronic tubes for controlling said rectifier in response to said voltage, said tubes being connected to said supply means to be energized by alternating current, and coupling transformer means disposed in said network to isolate said power rectifier from said direct-current means, and condition-responsive control means for superimposing another control on said circuit, said control means having a tube circuit connected to said supply means to be energized by alternating current and having another isolating transformer coupling said control means with said network.

4. An electronic system for direct-current control of dynamoelectric machinery from an alternating-current source, comprising alternating-current supply means, a dynamoelectric machine circuit to be controlled, an electronic power rectifier connected between said supply means and said ciruit to provide said circuit with direct-current energization, an electronic amplifier network connected to said power rectifier for controlling said rectifier and having an input circuit, a condition-responsive source of alternating cue voltage dependent upon said energization, alternating-current reference means connected to said supply means to provide constant alternating reference voltage, and isolating transformer means coupling said source and said reference means with said input circuit to control said network in accordance with the difference of said cue and reference voltages.

5. An electronic system for direct-current control of dynamoelectric machinery from an alternating-current source, comprising alternating-current supply means, a dynamoelectric machine circuit to be controlled, an electronic power rectifier connected between said supply means and said circuit to provide said circuit with direct-current energization, an electronic amplifier network connected to said power rectifier for controlling said rectifier and having an input circuit, a condition-responsive source of alternating cue voltage dependent upon said energization, alternating-current reference means connected to said supply means to provide constant alternating reference voltage, rectifier means, two transformers coupling said source and said reference means respectively with said rectifier means and being poled relative to each other to apply to said rectifier means a control voltage proportional to the difference of said cue and reference voltages, said rectifier means being connected with said network for controlling said network by said control voltage.

6. An electronic control system for an electric drive, comprising alternating-current supply means, a controllable power rectifier connected to said supply means and having a direct-current output circuit to provide speed-controlling voltage for the drive, condition-responsive circuit means for providing control voltage in accordance with the speed of the drive, an amplifier network connected between said circuit means and said rectifier and having electronic tubes for controlling said rectifier in response to said control voltage, said tubes being plate-connected to said supply means to be energized by alternating current, and coupling transformer means disposed in said network to isolate said circuit means from said rectifier.

7. An electronic control system for an electric drive, comprising a direct-current drive motor, alternating-current supply means, circuit means connected between said motor and said supply means and comprising a controllable power rectifier for applying variable voltage to said motor to control the motor speed, a reference means connected with said supply means to provide a constant alternating reference voltage, a tachometer alternator connected with said motor to provide an alternating cue voltage according to said speed, electronic amplifier means having an output circuit connected with said rectifier and having an input circuit, said reference means and said alternator being connected to said input circuit and poled relative to each other for controlling said rectifier to change said variable voltage in accordance with the difference of said respective reference and cue voltages.

8. An electronic control system for an electric drive, comprising an electric drive motor, alternating-current supply means circuit means connected between said motor and said supply means and comprising controllable electronic power tubes for applying variable voltage to said motor to control the motor speed, electronic amplifier means having an output circuit connected to said tubes for controlling said voltage and having an input circuit, rectifier means connected to said input circuit for applying thereto a variable control voltage, reference means connected with said supply means to provide a constant alternating reference voltage, a tachometer alternator connected with said motor to provide an alternating cue voltage according to said speed, and isolating transformer means coupling said reference means and said alternator in series-opposed voltage relation to said rectifier means.

9. An electronic control system for an electric drive, comprising an electronic drive motor, alternating-current supply means circuit means connected between said motor and said supply means and comprising controllable electronic power tubes for applying variable voltage to said motor to control the motor speed, electronic amplifier means having an output circuit connected to said tubes for controlling said voltage and having an input circuit, rectifier means connected to said input circuit for applying thereto a variable control voltage, reference means connected with said supply means to provide a constant alternating reference voltage, a speed-responsive alternating-voltage source for providing a variable alternating cue voltage indicative of the drive speed, an amplifying network having electronic tubes connected with said supply means to be energized by alternating current and having an output circuit connected to said power tubes for controlling said power tubes, said network having an input circuit and isolating transformer means coupling said reference means and said source in mutually opposed voltage relation to said input circuit.

10. An electronic control system for an electric drive, comprising a direct-current drive motor, alternating-current supply means, circuit means connected between said motor and said supply means and comprising a controllable power rectifier for applying variable voltage to said motor to control the motor speed, an amplifier network having electronic tubes connected to said supply means to be energized by alternating current and having an output circuit connected to said power rectifier and an input circuit, reference means of normally constant voltage and variable-voltage means responsive to the speed of said motor connected in mutually opposed relation with said input circuit, current-responsive circuit means connected with said motor to provide voltage in accordance with the motor current, a current-limit control device having electronic tubes plate-connected to said supply means to be energized by alternating current and grid-connected to said current responsive circuit means to be controlled thereby, and isolating transformer means coupling said device with said network to superimpose current-limit control on said network when said current exceeds a given limit value.

11. An electronic control system for an electric drive, comprising, a direct-current drive motor, alternating-current supply means, electronic control means having a power rectifier connected between said motor and said supply means and having an input circuit for controlling said rectifier, voltage supply means connected to said input circuit to provide it with variable control input voltage and comprising condition-responsive means for varying said control voltage in accordance with the motor speed, current-responsive circuit means connected with said motor to provide voltage in accordance with the motor current, a current-limit control device having electronic tubes plate-connected to said supply means to be energized by alternating current and grid-connected to said current responsive circuit means to be controlled thereby, and isolating transformer means coupling said device with said electronic control means to superimpose thereon a current-limiting control when said current exceeds a given value.

12. An electronic system for direct-current control of dynamoelectric machinery from an alternating-current source, comprising alternating-current supply means, a dynamo-electric machine circuit to be controlled, an electronic power rectifier having an output circuit connected with said machine circuit to provide energization for the latter and having a control circuit for controlling said energization, a power transformer connecting said output circuit to said supply means, a phase-shifting resistance-capacitance circuit connecting said control circuit with said power transformer to impress on said control circuit an alternating component control voltage, an electronic amplifier network connected with said control circuit to impress thereon a direct component control voltage, and variable-voltage source means connected with said network for controlling said direct component control voltage.

13. An electronic control system, comprising a circuit to be controlled, multi-phase alternating-current supply means, a plurality of power transformers, a multiphase rectifier having a plurality of gaseous discharge tubes plate-connected through said respective transformers between said circuit and the respective phases of said supply means, each of said tubes having a grid circuit, controllable voltage supply means connected with said grid circuits to impress thereon a variable direct component of grid voltage, and resistance-capacitance circuits each connecting the grid circuit of one of said tubes with the appertaining one power transformer to impress on said grid circuit an alternating component grid voltage whose phase position is displaced relative to the plate voltage of said tube a given amount independent of the phase rotation of said supply means.

WALTER G. ROMAN.

REFERENCES CITED

The following references are of record in the file of this patent:

UNITED STATES PATENTS

| Number | Name | Date |
|---|---|---|
| 2,399,421 | Artz | Apr. 30, 1946 |
| 2,409,970 | Agins | Oct. 22, 1946 |
| 2,425,009 | Shepherd | Aug. 5, 1947 |